United States Patent
Jeon et al.

(10) Patent No.: US 9,637,103 B2
(45) Date of Patent: May 2, 2017

(54) METHOD OF CONTROLLING BRAKING SYSTEM USING BRAKING DEVICE HAVING ELECTROMECHANICAL PARKING FUNCTION

(71) Applicants: HYUNDAI MOTOR COMPANY, Seoul (KR); Hyundai Mobis Co., Ltd., Seoul (KR)

(72) Inventors: Gab Bae Jeon, Hwaseong-si (KR); Jae Hun Shim, Hwaseongg-si (KR); Jounghee Lee, Suwon-si (KR); Sang Hyun Shim, Seoul (KR); Jongsung Kim, Seoul (KR)

(73) Assignees: HYUNDAI MOTOR COMPANY, Seoul (KR); HYUNDAI MOBIS CO., LTD., Seoul (KR)

( * ) Notice: Subject to any disclaimer, the term of this patent is extended or adjusted under 35 U.S.C. 154(b) by 67 days.

(21) Appl. No.: 14/709,403

(22) Filed: May 11, 2015

(65) Prior Publication Data

US 2016/0144842 A1    May 26, 2016

(30) Foreign Application Priority Data

Nov. 24, 2014    (KR) ........................ 10-2014-0164782

(51) Int. Cl.
*B60T 13/74*    (2006.01)
*B60T 7/04*    (2006.01)
(Continued)

(52) U.S. Cl.
CPC ............ *B60T 13/741* (2013.01); *B60T 7/042* (2013.01); *B60T 13/588* (2013.01);
(Continued)

(58) Field of Classification Search
CPC .......... B60T 7/107; B60T 7/042; B60T 7/045; B60T 13/741; B60T 13/588;
(Continued)

(56) References Cited

U.S. PATENT DOCUMENTS

2006/0267402 A1* 11/2006 Leiter .................... B60T 7/107
 303/20
2012/0245815 A1* 9/2012 Schneider ............... B60T 7/107
 701/70
(Continued)

FOREIGN PATENT DOCUMENTS

JP    2007-519568 A    7/2007
JP    2009-078747 A    4/2009

*Primary Examiner* — Melanie Torres Williams
(74) *Attorney, Agent, or Firm* — McDermott Will & Emery LLP

(57) ABSTRACT

A method of controlling a braking system using a brake device having an electromechanical parking function uses a brake device having an electromechanical parking function includes: a parking release and preliminary braking step of releasing a limitation of an operation location of an electromechanical element, pressing a secondary piston by a primary piston by operating the electromechanical element, and generating a braking force in the front wheel and the rear wheel by operating a hydraulic pump that is connected to a hydraulic circuit system; a primary piston backward moving step of allowing oil inflow of an accumulator for a complex caliper unit and separating the primary piston from the secondary piston by moving the primary piston; and a primary piston forward pressing step of blocking oil inflow of an accumulator for the complex caliper unit and pressing the secondary piston by moving the primary piston by the electromechanical element.

11 Claims, 7 Drawing Sheets

(51) Int. Cl.
*B60T 13/58* (2006.01)
*F16D 55/226* (2006.01)
*F16D 121/02* (2012.01)
*F16D 121/24* (2012.01)
*F16D 125/40* (2012.01)
*F16D 125/48* (2012.01)

(52) U.S. Cl.
CPC ........ *F16D 55/226* (2013.01); *F16D 2121/02* (2013.01); *F16D 2121/24* (2013.01); *F16D 2125/40* (2013.01); *F16D 2125/48* (2013.01)

(58) Field of Classification Search
CPC ............... F16D 55/226; F16D 2121/02; F16D 2121/24; F16D 2125/40; F16D 2125/48
USPC ................................. 188/72.3, 72.6
See application file for complete search history.

(56) References Cited

U.S. PATENT DOCUMENTS

| | | | |
|---|---|---|---|
| 2013/0213746 A1* | 8/2013 | Poertzgen | B60T 7/042 188/72.6 |
| 2014/0144730 A1* | 5/2014 | Schwarz | B60T 7/042 188/72.3 |
| 2014/0214269 A1* | 7/2014 | Knechtges | B60T 13/588 701/34.4 |

* cited by examiner

METHOD OF CONTROLLING BRAKING SYSTEM USING BRAKING DEVICE HAVING ELECTROMECHANICAL PARKING FUNCTION

CROSS-REFERENCE TO RELATED APPLICATION

This application claims priority to and the benefit of Korean Patent Application No. 10-2014-0164782 filed in the Korean Intellectual Property Office on Nov. 24, 2014, the entire contents of which are incorporated herein by reference.

BACKGROUND DESCRIPTION (a) Field

This disclosure relates generally to a method of controlling an electromechanical brake device, and more particularly to a method of controlling a system using a brake device that can perform an electronic parking function and having an electromechanical parking function that can perform a primary braking function with an electronic and complex mechanical method.

(b) Description of the Related Art

In general, a parking brake uniformly distributes a force that is applied to a parking cable by pulling a parking brake lever connected to a brake mechanism mounted in a wheel through an equalizer, and thus the brake mechanism restricts the wheel to thereby prevent a vehicle from moving.

In this way, when braking a wheel by manipulating a parking brake lever, a driver should manually operate a parking brake lever for braking while parked. However, it is inconvenient to perform a manual operation at this time, and the driver often forgets to carry out the manual operation. There accordingly is danger of a safety accident.

In order to address the inconvenience of such a manual method, an Electrical Parking Brake (EPB) is implemented that enables a braking state to be safely maintained by a driver when simply performing a parking operation upon parking by using the driving torque of a motor.

A braking system that can perform complex active control by using a hydraulic pressure and an electromechanical element are of electro-hydraulic brake (EHB, the same term as hEMB) and electric motion booster types.

Here, a braking system using a brake device having a complex electromechanical parking function using hydraulic pressure and an electromechanical element performs a parking function using an electromechanical element of a front wheel, and when a parking function is released, by appropriately distributing a braking force of a front wheel and a rear wheel by hydraulic pressure and an electromechanical element step by step, primary braking may be executed.

However, in a braking system using a brake device having a conventional electromechanical parking function, when the vehicle releases an EPB when parked on a sloping road and descends when a primary braking pedal is not released, if a gap between a primary piston and a secondary piston is not secured, additional braking force may not occur.

That is, when a gap between the primary and secondary pistons is not secured, booster power operating when the primary piston presses the secondary piston cannot be used due to an area difference between the primary piston and the secondary piston. Thus, a problem occurs in that an additional current should be applied to an electric motion motor corresponding to an electromechanical element when a braking force is applied, or the braking force that a driver requires may not be produced.

The above information disclosed in this Background section is only for enhancement of understanding of the background of the invention and therefore it may contain information that does not form the prior art that is already known in this country to a person of ordinary skill in the art.

SUMMARY

Described herein is method of controlling a brake device using a braking system having advantages of being capable of disposing brake oil at a primary piston and a secondary piston by securing a gap therebetween. This is done by securely separating the primary piston and the secondary piston while braking is converted to a primary braking state and thus operating booster power having responsiveness when pressing the secondary piston by the primary piston and by providing a compact structure and economic efficiency by reducing capacity of an electric motion motor related to braking because braking by booster power can be executed.

An exemplary embodiment of the present invention provides a method of controlling a braking system using a brake device having an electromechanical parking function, including: a step of starting parking braking by adjusting a hydraulic pressure of a complex caliper unit that is provided to any one of a front wheel and a rear wheel, and a hydraulic caliper unit that is provided to the other one to perform braking by operating at least one of a hydraulic circuit system and an electromechanical element; a step of generating a braking force in the brake pad by pressing contacting by a primary piston disposed at the complex caliper unit to operate a secondary piston disposed at the complex caliper unit so as to be operated by the hydraulic circuit system to press a brake pad by the electromechanical element, and completing the parking braking by limiting an operation location of the electromechanical element; a parking release and preliminary braking step of releasing a limitation of an operation location of the electromechanical element, pressing the secondary piston by the primary piston by operating the electromechanical element, and generating a braking force in the front wheel and the rear wheel by operating a hydraulic pump that is connected to the hydraulic circuit system; a primary piston backward moving step of allowing oil inflow of an accumulator for the complex caliper unit and separating the primary piston from the secondary piston by moving the primary piston; and a primary piston forward pressing step of blocking oil inflow of an accumulator for the complex caliper unit and pressing the secondary piston by moving the primary piston by the electromechanical element.

The parking release and preliminary braking step may include blocking a first opening and closing valve connected from the reservoir to the complex caliper unit and the hydraulic caliper unit side so as to block movement of oil from the hydraulic pump connected to the complex caliper unit and the hydraulic caliper unit to the reservoir side at which oil is stored, and disposed on a first hydraulic line that is connected to the hydraulic pump.

The parking release and preliminary braking step may include operating the hydraulic pump to a target pressure level that can hold a vehicle by a braking force applied to the rear wheel side, when generating a braking force in the front wheel and the rear wheel by operating the hydraulic pump.

The parking release and preliminary braking step may include opening a second opening and closing valve on a second hydraulic line that connects the first hydraulic line and the complex caliper unit, and opening a third opening and closing valve on a third hydraulic line that connects the first hydraulic line and the hydraulic caliper unit, when generating a braking force in the front wheel and the rear wheel by operating the hydraulic pump.

Oil of an accumulator connected to the complex caliper unit and the hydraulic caliper unit may be used up to the target pressure level, and a third hydraulic line connected to the hydraulic caliper unit may be blocked by a third opening and closing valve provided to apply the hydraulic pressure to the hydraulic caliper unit, when arriving at the target pressure.

The primary piston backward moving step may include releasing pressing of the primary piston by the electromechanical element and opening a fourth opening and closing valve disposed on a fourth hydraulic line that connects the complex caliper unit and the accumulator so as to allow oil inflow of an accumulator for the complex caliper unit.

A gap may be provided between the primary piston and the secondary piston by moving the primary piston that is screw coupled to the spindle by rotating a spindle that connects the electromechanical element and the primary piston.

Movement of the primary piston by the spindle may be stopped when a hydraulic pressure of the complex caliper unit is detected to be at atmospheric pressure or less.

The primary piston forward pressing step may include closing the fourth opening and closing valve, moving the primary piston toward the secondary piston by the spindle, and providing a pressure to the secondary piston by booster power by a cross-section ratio of the primary piston and the secondary piston.

The primary piston may press the secondary piston until a braking force by the complex caliper unit attains a braking force level by the hydraulic caliper unit.

The method may further include a brake pedal response and primary braking step that allows oil inflow by the hydraulic pump to the hydraulic caliper unit by opening the third opening and closing valve on a third hydraulic line connected to the hydraulic caliper unit and in which the primary piston is moved to generate a braking force to correspond to a pressure according to brake pedal manipulation.

The electromechanical element may be an electric motion motor, the primary piston may be screw coupled to the spindle rotated by the electric motion motor, gears to transfer a torque may be disposed between the spindle and the electric motion motor, and a brake unit operated by a solenoid may contact any one of the gears to limit or release operation of the electromechanical element.

DETAILED DESCRIPTION OF THE EMBODIMENTS

Figure 1:
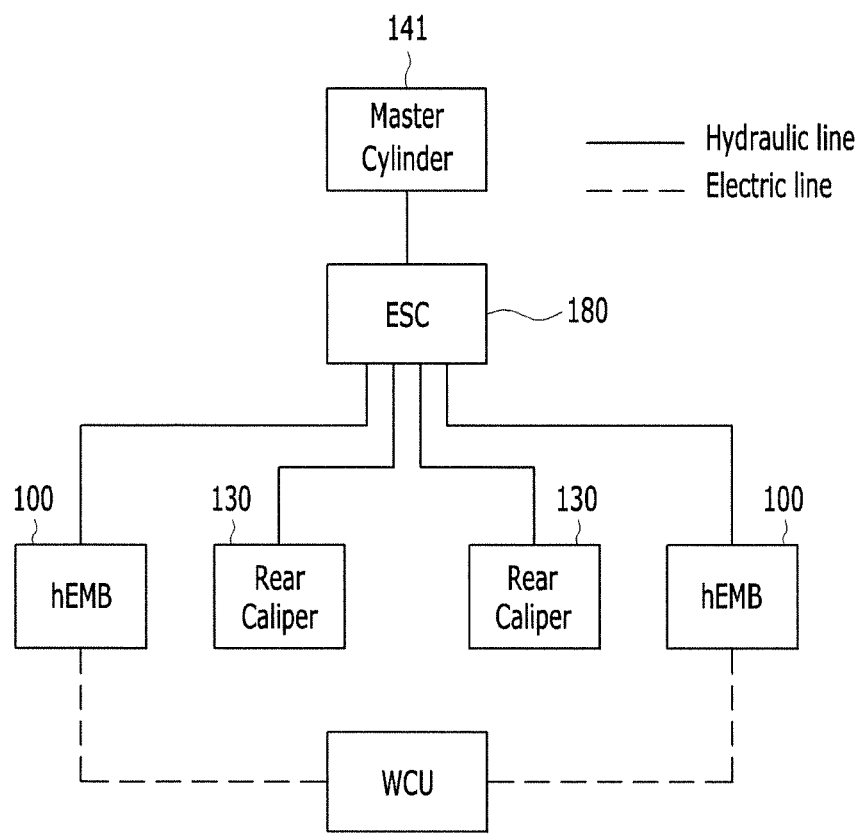
FIG. 1 is a schematic block diagram illustrating a braking system using a brake device having an electromechanical parking function according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in the drawings, a size and thickness of each element are randomly represented for better understanding and ease of description, and the present invention is not limited thereto, and the thickness of several portions and areas are exaggerated for clarity.

In the following detailed description, terms such as a 'first' and a 'second' are used for distinguishing the same elements, but the terms are not limited to order.

In addition, in the entire specification, unless explicitly described to the contrary, the word "comprise" and variations such as "comprises" or "comprising" will be understood to imply the inclusion of stated elements but not the exclusion of any other elements.

In addition, the terms " . . . unit", " . . . means", "-er", and "member" described in the specification mean units for processing at least one function or operation.

As shown in FIGS. 1 to 4, a braking system using a brake device having an electromechanical parking function according to an exemplary embodiment of the present invention includes a complex caliper unit 100 disposed at a front wheel to perform a braking function in a vehicle, a hydraulic caliper unit 130 disposed at a rear wheel, and a hydraulic circuit system 175 (FIG. 4) that provides a hydraulic pressure that can operate the complex caliper unit 100 and the hydraulic caliper unit 130.

In order for the complex caliper unit 100 to be operated by at least one of the hydraulic circuit system 175 and an electromechanical element to perform a braking function, the complex caliper unit 100 is formed by a hydraulic operation element and an electromechanical element, and the hydraulic caliper unit 130 is operated by a hydraulic operation element.

Such a complex caliper unit 100 and hydraulic caliper unit 130 press a pair of brake pads 137 that contact a brake disk 139 to perform a brake function to the brake disk 139 side and are thus operated to contact the brake disk 139.

As described above, the complex caliper unit 100 and the hydraulic caliper unit 130 according to the present exemplary embodiment are connected to the hydraulic circuit system 175 that provides a hydraulic pressure. As described later, such a hydraulic circuit system 175 may include a master cylinder 141 and a hydraulic pump 155 that receive oil supply from a reservoir 150 corresponding to an oil supply source.

Further, the hydraulic circuit system 175 may include second and third hydraulic lines 156 and 157 that are connected to each of the complex caliper unit 100 and the hydraulic caliper unit 130 and in which an opening and closing valve 136 for blocking oil movement is disposed.

Figure 4:
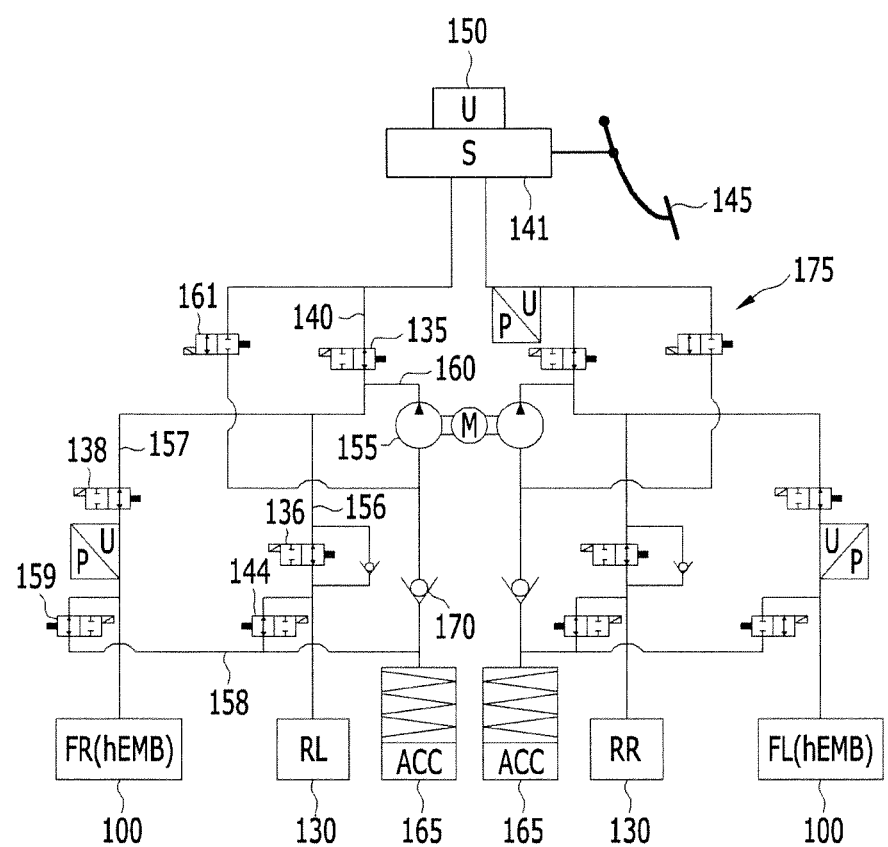
FIG. 4 is a circuit diagram illustrating an entire hydraulic pressure of a braking system using a brake device having an electromechanical parking function according to an exemplary embodiment of the present invention.

The hydraulic circuit system 175 of the present exemplary embodiment is represented by a hydraulic circuit diagram, FIG. 4. First to fifth opening and closing valves 135, 136, 138, 144, and 159 used for such a hydraulic circuit have a function of allowing or blocking movement of oil to each hydraulic line, and for example, may be provided with a spool valve that is operated with a solenoid. Further, in the present exemplary embodiment, an electromechanical element may be provided with an electric motion motor 115 that provides a torque.

Further, in the hydraulic circuit system 175, the hydraulic pump 155 is disposed to provide a hydraulic pressure to each of the second and third hydraulic lines 156 and 157, and the master cylinder 141 that is operated by a brake pedal 145 is disposed.

In order to provide a hydraulic pressure of the master cylinder 141 to each of the second and third hydraulic lines 156 and 157, such a master cylinder 141 is connected by the second and third hydraulic lines 156 and 157 and a first hydraulic line 140. The first opening and closing valve 135 is disposed in the first hydraulic line 140 in order to block oil movement to the hydraulic circuit system 175.

In a braking system using a brake device having an electromechanical parking function according to the present exemplary embodiment, operation thereof may be controlled by a braking control unit 180 that controls operation of the hydraulic circuit system 175, a hydraulic operation element, and an electromechanical element.

While performing a pressing action to the brake disk 139 by an electromechanical element, the braking control unit 180 simultaneously executes parking braking of the complex caliper unit 100 and the hydraulic caliper unit 130, by hydraulic pressure release, by opening of the first opening and closing valve 135 and the second and third opening and closing valves 136 and 138. In such a parking braking state, an electromechanical element fixes a location operated by a lock unit 125.

Upon parking braking, oil of the complex caliper unit 100 and the hydraulic caliper unit 130 may pass through the second and third opening and closing valves 136 and 138 and the first opening and closing valve 135, and move to the reservoir 150 side. Thereby, a braking force by a hydraulic pressure is excluded.

In this way, after the brake pad 137 is pressed by operation of the electric motion motor 115, which is an electromechanical element, a location lock action of the electric motion motor 115 that fixes an operated location of the electric motion motor 115 is performed and thus parking braking is complete.

In order to release a parking braking state, when a driver steps on a brake pedal, the braking control unit 180 closes the first opening and closing valve 135, and the second and third opening and closing valves 136 and 138 maintain an open state.

In this case, when the driver releases an EPB, by pressing the secondary piston 116 by the primary piston 117, to be described later, by an electromechanical element, the braking control unit 180 maintains pressing to the brake pad 137 and allows an inverse rotation, i.e., a backward movement of an electromechanical element, by releasing the lock unit 125 that simultaneously fixes a location of the electromechanical element.

Thereafter, the braking control unit 180 provides hydraulic pressure to the complex caliper unit 100 and the hydraulic caliper unit 130 by the hydraulic pump 155, and further increases a braking force to a front wheel and a rear wheel. Oil is provided from an accumulator 165 that can provide hydraulic pressure of a predetermined pressure.

Such a state is one in which a braking force of a rear wheel is increased further than that of a front wheel so as to hold a location of a vehicle with only the braking force of a rear wheel, and the vehicle therefore depends on the braking force of the rear wheel side.

In this case, the third opening and closing valve 138 is in a closed state to maintain a braking force by the hydraulic caliper unit 130, and the second opening and closing valve 136 allows backward movement of the primary piston 117, as described later, and is in an open state to provide a hydraulic pressure.

In this way, the third opening and closing valve 138 is closed and in a state in which the brake pad 137 is pressed, the parking braking is released, and thereafter, pressing of the primary piston 117 by the electromechanical element is released and thus the primary piston 117 is separated from the secondary piston 116. That is, the primary piston 117 moves backward by the electromechanical element.

Figure 2:
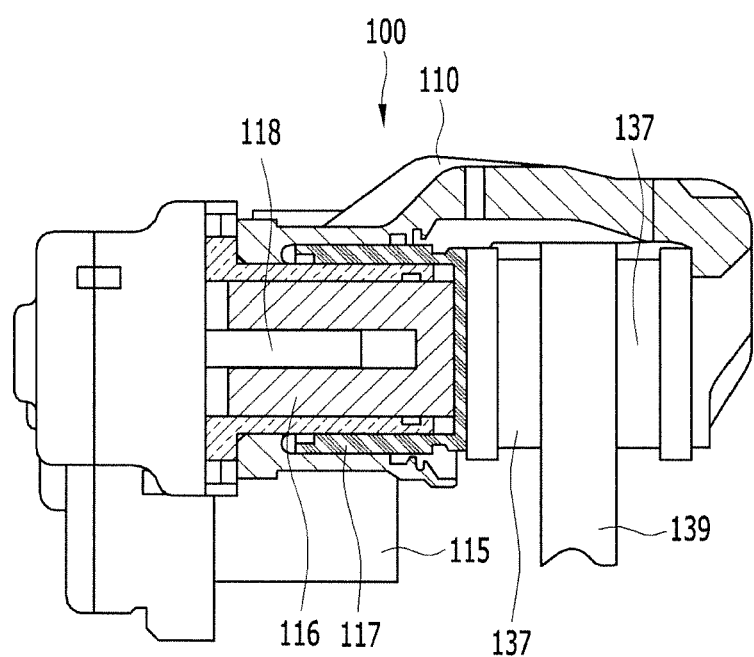
FIG. 2 is a cross-sectional view illustrating a complex caliper unit of FIG. 1.

Referring to FIG. 2, while location locking of the electric motion motor 115 of FIG. 1 is released, decompressing of the electric motion motor 115 is performed, the fourth opening and closing valve 144 is opened so that oil is provided to correspond to decompressing of the electric motion motor 115 to the complex caliper unit 100 side, and oil of the accumulator 165 may be provided.

Thereafter, the fourth opening and closing valve 144 is closed, the primary piston 117 advances to the secondary piston 116 side and thus the brake pad 137 is pressed. After the third opening and closing valve 138 is opened, a boost pressure by the hydraulic pump 155 to the complex caliper unit 100 and the hydraulic caliper unit 130 is performed and thus primary braking may be performed.

When the primary piston 117 advances to the secondary piston 116 side by the electromechanical element, hydraulic booster power by the primary piston 117 operates in the secondary piston 116.

In this case, as the primary piston 117 moves in response to pushing power of a brake pedal, hydraulic pressure booster power is adjusted, and in a state in which the brake pad 137 pressing contacts the brake disk 139, a braking force of primary braking may be adjusted.

In such a braking system using a brake device having an electromechanical parking function according to the present exemplary embodiment, when parking braking is converted to a primary braking state, while decompressing the electric motion motor 115, a gap between the primary piston 117 and the secondary piston 116 may be secured.

Accordingly, as a hydraulic pressure by the hydraulic pump 155 is provided to the complex caliper unit 100 and the hydraulic caliper unit 130, responsiveness of pedal operation can be enhanced, and when pressing the secondary piston 116 by the primary piston 117, booster power can be smoothly operated.

A detailed control process of the braking control unit 180 will be described in a method of controlling a braking system using a brake device having an electromechanical parking function according to an exemplary embodiment of the present invention to be described later, and thus a description thereof will be omitted.

Hereinafter, constituent elements of a braking system using a brake device having an electromechanical parking function according to an exemplary embodiment of the present invention will be described in detail.

Figure 3:
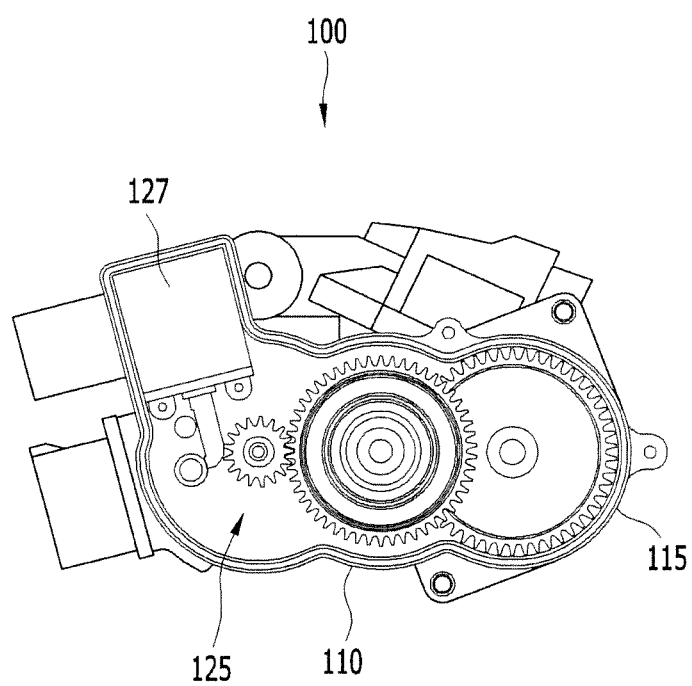
FIG. 3 is a side view illustrating the inside of a complex caliper unit of FIG. 2.
Figure 5:
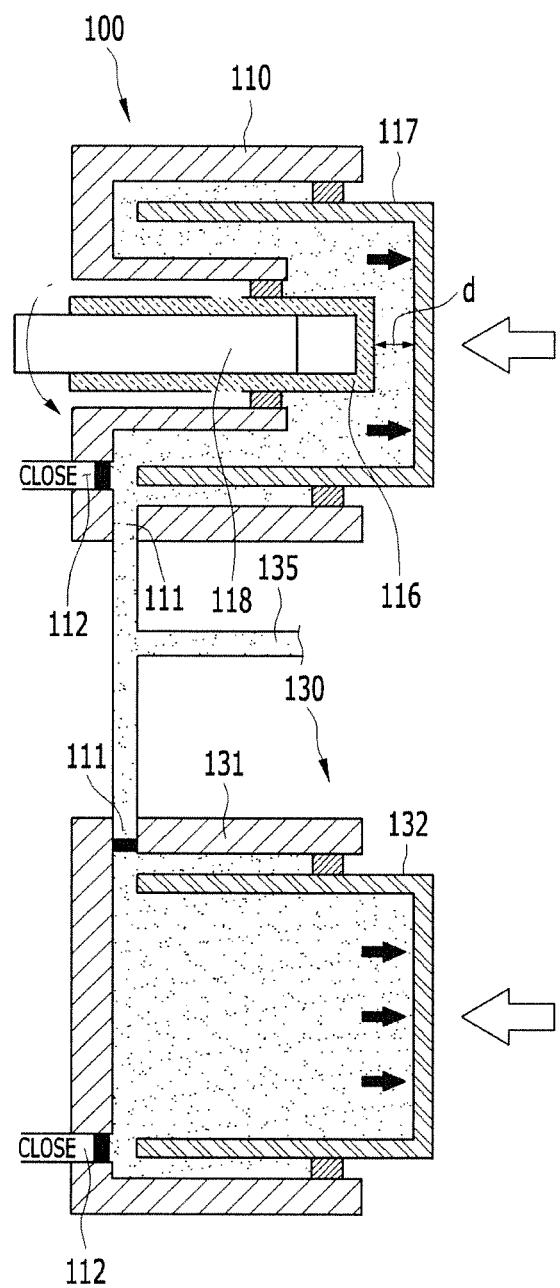
FIG. 5 is a schematic diagram illustrating a complex caliper unit and a hydraulic caliper unit of FIG. 1.
Figure 6:
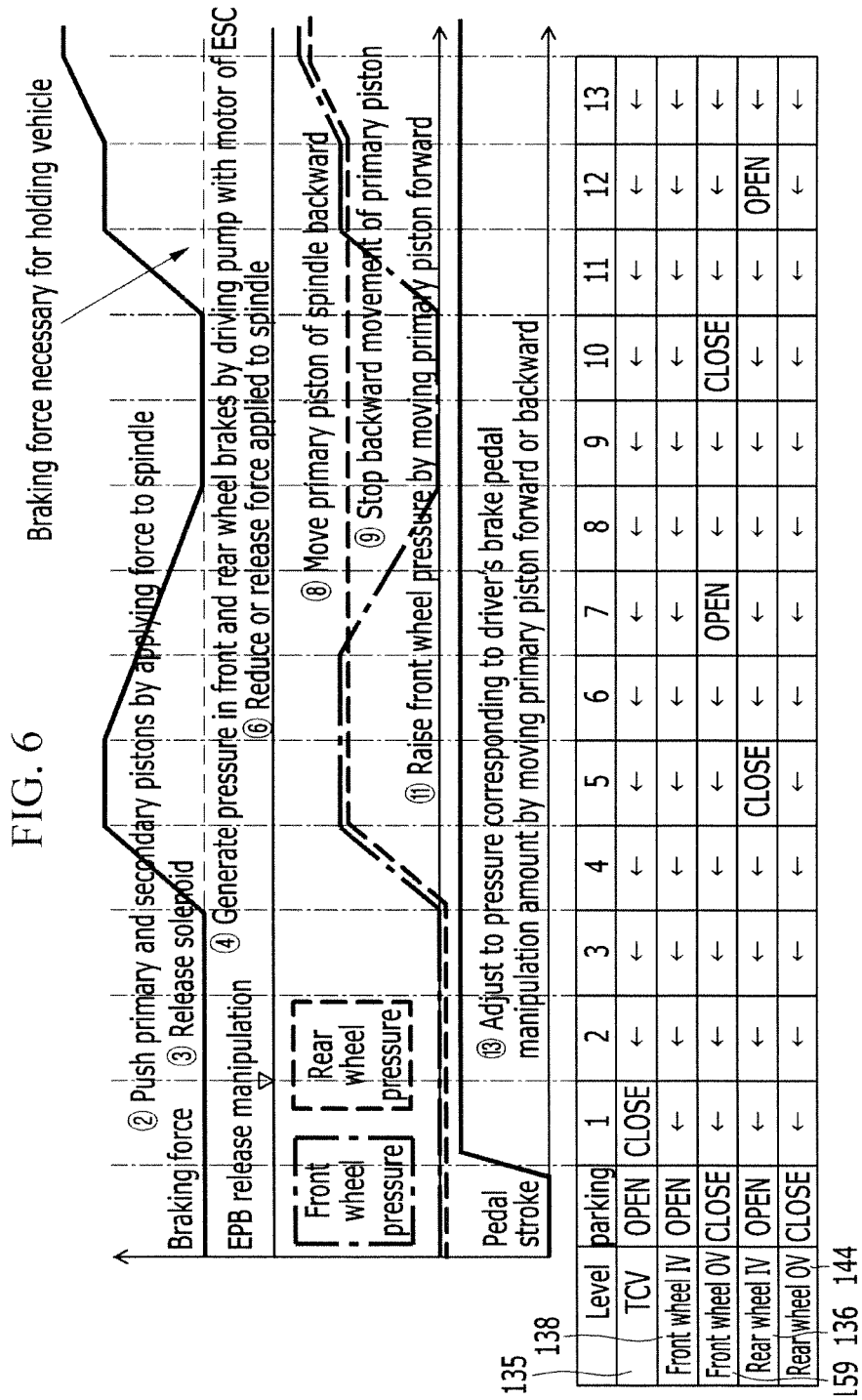
FIG. 6 is a timing chart illustrating a sequential opening and closing state and braking force of first to sixth opening and closing valves according to a method of controlling a braking system using a brake device having an electromechanical parking function according to an exemplary embodiment of the present invention.
Figure 7:
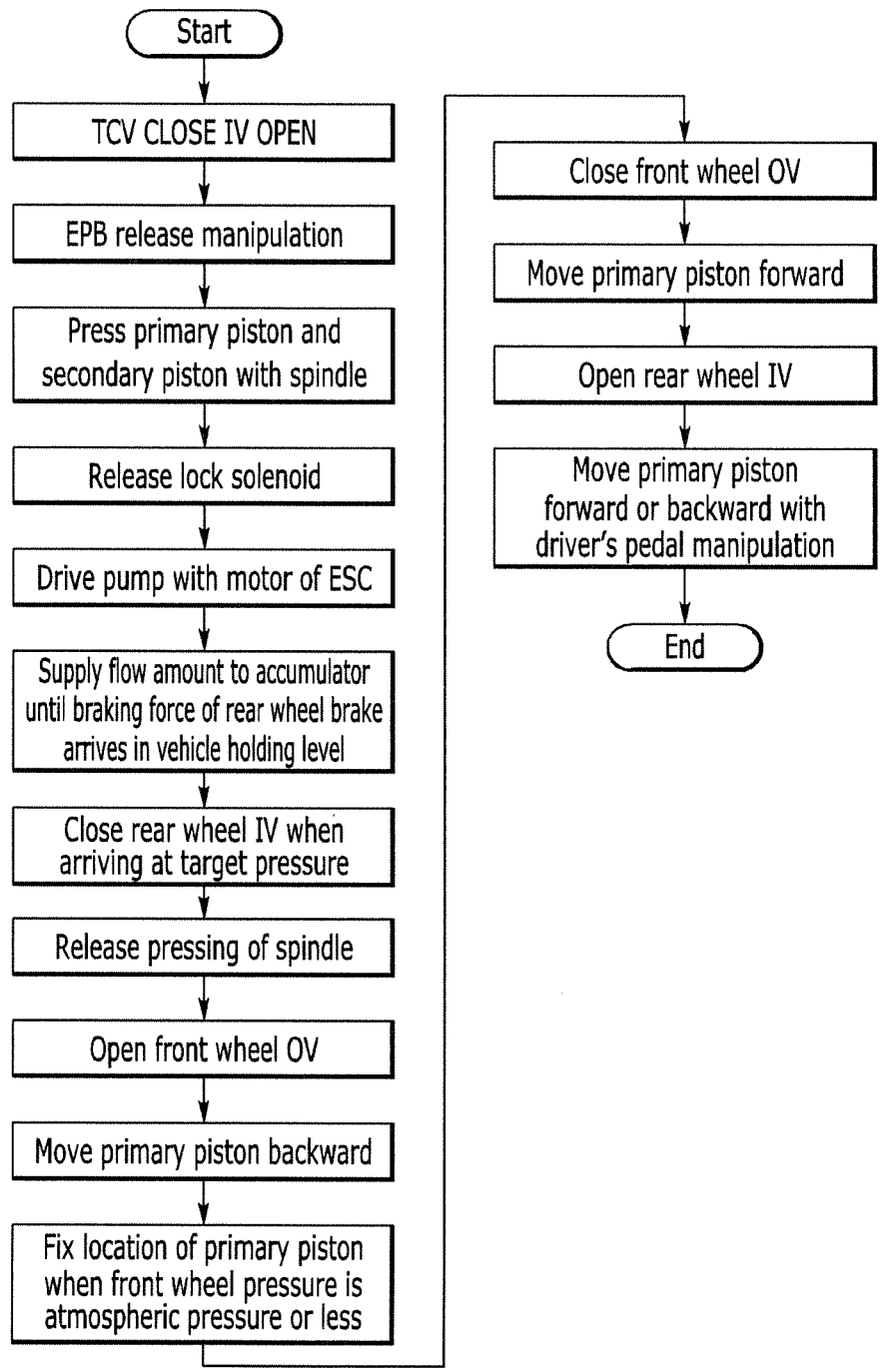
FIG. 7 is a flowchart illustrating a method of controlling a braking system using a brake device having an electromechanical parking function according to an exemplary embodiment of the present invention.

Referring to FIGS. 2, 3, and 5, the complex caliper unit 100 according to the present exemplary embodiment has a complex housing body 110 with an inlet 111 connected to the hydraulic circuit system 175 and an outlet 112 that discharges oil for hydraulic pressure.

In the complex housing body 110, the secondary piston 116 may be moved by either one of the electric motion motor 115 and a hydraulic pressure, and the primary piston 117 is provided to move from the secondary piston 116 by the electric motion motor 115 to contact the secondary piston 116 or to separate from the secondary piston 116.

The primary piston 117 is driven by the electric motion motor 115 within the complex housing body 110, and may be screw-coupled to a spindle 118 that is threaded. Accordingly, the primary piston 117 may be moved by rotation of the spindle 118 by the electric motion motor 115.

Such a complex caliper unit 100 may be installed at a front wheel for general braking of the front wheel and perform parking braking by braking the front wheel by the electric motion motor 115. After parking braking is released, the complex caliper unit 100 is operated by hydraulic pressure together with the hydraulic caliper unit 130 to perform primary braking.

In the complex caliper unit 100 according to the present exemplary embodiment, the spindle 118 is rotated by the electric motion motor 115 corresponding to the electromechanical element upon parking braking, and thus the primary piston 117 may be moved to the secondary piston 116 side.

Accordingly, the secondary piston 116 is pressed by the primary piston 117 and thus the brake pad 137 may be in pressing contact with the brake disk 139, and an operation location of the electric motion motor 115 is locked and fixed by the lock unit 125 that is operated by the solenoid 127, as described. Thus, parking braking may be complete. Such parking braking may connect a parking switch using a parking lever, a parking button, or a parking pedal at the inside of the vehicle.

At an internal space between the secondary piston 116 and the primary piston 117, brake oil exists, and in a state in which the secondary piston 116 and the primary piston 117 are separated, booster power is formed due to a different cross-sectional area of the secondary piston 116 and the primary piston 117. After the secondary piston 116 contacts the primary piston 117, booster power disappears. Upon such parking braking, the primary piston 117 is in a contact state with the secondary piston 116.

As shown in FIG. 5, in order to generate booster power upon primary braking, the secondary piston 116 and the primary piston 117 should be separated by an appropriate gap d.

The hydraulic caliper unit 130 according to the present exemplary embodiment has a hydraulic housing body 131 in which an inlet 111 connected to the hydraulic circuit system 175 and the outlet 112 that discharges oil for a hydraulic pressure are provided together with the complex housing body 110.

In the hydraulic housing body 131, in order to move the brake pad 137, a hydraulic piston 132 is provided to move to the hydraulic housing body 131. The inlet 111 and the outlet 112 of such a complex housing body 110 and hydraulic housing body 131 are connected to the hydraulic circuit system 175.

When a driver stops and disposes a vehicle at a location such as on a slope when in a running state, the vehicle performs parking braking. When the vehicle again drives from a stop state, in order to prevent backward movement of the vehicle on a slope, the driver steps on the brake pedal 145 and steps on the accelerator pedal while releasing parking braking, thereby driving the vehicle.

Referring to FIGS. 4 and 5, when parking braking is converted to primary braking, in the complex caliper unit 100 and the hydraulic caliper unit 130 according to the present exemplary embodiment, while pressing of the electric motion motor 115 in the electromechanical element, i.e., the foregoing complex caliper unit 100 is performed by the braking control unit 180, the inlet 111 is opened and the outlet 112 is closed to inject oil into the accumulator 165.

The primary piston 117 is separated from the secondary piston 116 and the secondary piston 116 and the hydraulic piston 132 are simultaneously pressed by a hydraulic pressure that is provided to the complex housing body 110 and the hydraulic housing body 131. Thus the brake pad 137 pressing contacts the brake disk 139 and a braking state of the brake disk 139 may be converted from parking braking to primary braking.

A braking system using a brake device having an electromechanical parking function according to the present exemplary embodiment may further include a pump supply line 160 that connects the first hydraulic line 140 to the hydraulic pump 155 and in which a pump valve 161 for blocking oil movement is disposed, and also include the accumulator 165 connected together with a check valve 170 for preventing backward flow to the pump supply line 160 between the pump valve 161 and the hydraulic pump 155 and together connected to another opening and closing valve 136 for blocking of oil movement at the hydraulic caliper unit 130 side.

In such an accumulator 165, oil that can provide a predetermined hydraulic pressure before parking braking may be stored. Thus when parking braking is converted to primary braking, an appropriate hydraulic pressure for generating a predetermined braking force to the complex caliper unit 100 and the hydraulic caliper unit 130 side that are connected on a hydraulic circuit may be provided.

When decompressing of the primary piston 117 by the electric motion motor 115 is started, a hydraulic pressure of the accumulator 165 may be provided to the complex housing body 110 and the hydraulic housing body 131 through the hydraulic circuit system 175.

Hereinafter, a method of controlling a braking system using a brake device having an electromechanical parking function according to an exemplary embodiment of the present invention will be described.

Referring to FIGS. 1 to 7, in a method of controlling a braking system using a brake device having an electromechanical parking function according to an exemplary embodiment of the present invention, in order to perform a braking function by operating at least one of the hydraulic circuit system 175 and the electromechanical element, by adjusting a hydraulic pressure to the complex caliper unit 100 provided in either one of a front wheel and a rear wheel and the hydraulic caliper unit 130 provided in the other thereof, parking braking is started. In this case, by pressing contacting the secondary piston 116 that is operated by the hydraulic circuit system 175 to press the brake pad 137 with the primary piston 117 operated by the electromechanical element, a braking force occurs in the brake pad 137, and by limiting an operation location of the electromechanical element, parking braking is completed.

Here, by pressing the secondary piston 116 operated by the hydraulic circuit system 175 by the primary piston 117 operated by the electric motion motor 115, the brake pad 137 pressing contacts with the brake disk 139, and by limiting operation of the electric motion motor 115, parking braking may be executed.

Thereafter, parking release and preliminary braking step is performed that releases a limitation of an operation location of the electromechanical element and that presses the secondary piston 116 by the primary piston 117 by operating the electromechanical element and that generates a braking force in a front wheel and a rear wheel by operating the hydraulic pump 155.

In this case, in order to hold a vehicle by a braking force of a rear wheel, a hydraulic pressure may be provided to the rear wheel side. Oil necessary for hydraulic pressure increase of such rear wheel side is provided from the accumulator 165.

At the parking release and preliminary braking step, in order to block movement of oil from the hydraulic pump 155 connected to the complex caliper unit 100 and the hydraulic caliper unit 130 to the reservoir 150 side in which oil is stored, the first opening and closing valve 135 disposed on the first hydraulic line 140 connected from the reservoir 150 to the complex caliper unit 100 and the hydraulic caliper unit 130 side and connected to the hydraulic pump 155 may be blocked.

At the parking release and preliminary braking step, when generating a braking force to a front wheel and a rear wheel by operating the hydraulic pump 155, the second opening and closing valve 136 on the second hydraulic line 156 that connects the first hydraulic line 140 and the complex caliper unit 100 may be opened.

Further, at the parking release and preliminary braking step, when generating a braking force in a front wheel and a rear wheel by operating the hydraulic pump 155, the hydraulic pump 155 may be operated to a target pressure level that can hold a vehicle by a braking force applied to the rear wheel side, and when a hydraulic pressure arrives at a target pressure, the third hydraulic line 157 is blocked by the third opening and closing valve 138.

In this case, oil of the accumulator 165 connected to the complex caliper unit 100 and the hydraulic caliper unit 130 is used up to the target pressure level, and when a hydraulic pressure arrives at a target pressure, the third hydraulic line 157 connected to the hydraulic caliper unit 130 may be blocked by the third opening and closing valve 138 provided to apply a hydraulic pressure to the hydraulic caliper unit 130.

Thereafter, by stopping operation of the spindle 118 applied by the electric motion motor 115, while decompressing of the primary piston 117 is performed, the primary piston 117 may be moved to separate from the secondary piston 116. Therefore, as a braking force by oil pressure operates in the hydraulic piston 132, a braking force by only hydraulic pressure may occur.

This is a case of generating a braking force reduced by decompressing of the electric motion motor 115 in a front wheel and a rear wheel. Further, oil may be provided from the accumulator 165 in which oil is stored to the complex caliper unit 100 so that the fourth opening and closing valve 144 is opened to provide a preset hydraulic pressure.

Backward movement according to decompressing of the primary piston 117 by such an electric motion motor 115 is performed while an operation limitation of the electric motion motor 115 is released, and backward movement may be performed until the primary piston 117 of the complex caliper unit 100 is separated by a predetermined distance from the secondary piston 116.

In this way, the primary piston backward movement step of allowing oil inflow to the complex caliper unit 100 and separating from the secondary piston 116 by moving the primary piston 117 by the electromechanical element is performed. Primary piston backward movement is performed until a brake pressure of a front wheel attains the same level as atmospheric pressure or less.

By moving the primary piston 117 that is screw-coupled to the spindle 118 by rotating the spindle 118 that connects the electromechanical element and the primary piston 117, a gap may be provided between the primary piston 117 and the secondary piston 116.

In this case, movement of the primary piston 117 by the spindle 118 may be stopped when hydraulic pressure of the complex caliper unit 100 is detected to at atmospheric pressure or less.

In the primary piston backward movement step, the fourth opening and closing valve 144 disposed on a fourth hydraulic line 158 that releases pressing of the primary piston 117 by the electromechanical element and that connects the complex caliper unit 100 and the accumulator 165 so as to allow oil inflow into the accumulator 165 for the complex caliper unit 100 may be opened.

While a location of the primary piston 117 is initialized, conversion from parking braking to primary braking is almost complete, and control that converts from parking braking to primary braking by the braking control unit 180 may be terminated.

Thereafter, in order to perform a braking function by the hydraulic circuit system 175, by providing a hydraulic pressure to the complex caliper unit 100 and the hydraulic caliper unit 130 provided in a rear wheel, a predetermined primary braking force may occur in a front wheel and a rear wheel.

That is, primary piston advancing pressing step of blocking oil inflow into the accumulator 165 for the complex caliper unit 100 by blocking the fourth opening and closing valve 144 and pressing the secondary piston 116 by moving the primary piston 117 by the electromechanical element is performed.

At such primary piston advancing pressing step, the primary piston 117 is moved to the secondary piston 116 side by the spindle, and a pressing force may be provided to the secondary piston 116 by booster power by a cross-section ratio of the primary piston 117 and the secondary piston 116.

Until a braking force by the complex caliper unit 100 becomes a braking force level by the hydraulic caliper unit 130, the primary piston 117 may press the secondary piston 116.

Thereafter, by opening the third opening and closing valve 138 on the third hydraulic line 157 connected to the hydraulic caliper unit 130, oil inflow by the hydraulic pump 155 is allowed into the hydraulic caliper unit 130, and brake pedal response and a primary braking step of moving the primary piston 117 may be performed so that a braking force occurs to correspond to a pressure according to a manipulation of the brake pedal 145.

Upon such primary braking, while a pressure of the primary piston 117 by the electric motion motor 115 is adjusted according to a driver requested braking force corresponding to a driver's pedaling power applied to the brake pedal 145, control in which a pressing force of the secondary piston 116 is adjusted by the primary piston 117 may be executed. Accordingly, while torque of the electric motion motor 115 increases or reduces according to the driver requested braking force, a pressing force of the primary piston 117 is adjusted.

As described above, the complex caliper unit 100 and the hydraulic caliper unit 130 are connected to the hydraulic pump 155 by the second and third hydraulic lines 156 and 157, respectively. The second and third opening and closing valves 136 and 138 are disposed to correspond to the second and third hydraulic lines 156 and 157 on the second and third hydraulic lines 156 and 157, and the second and third hydraulic lines 156 and 157 are operated by the brake pedal 145 and are connected by the master cylinder 141 and the first hydraulic line 140 that are connected to the reservoir 150 in which oil is stored. The first opening and closing valve 135 is disposed on the first hydraulic line 140, and in a state in which the first opening and closing valve 135 is closed, decompressing of the primary piston 117 by the electric motion motor 115 may be performed.

As described above, an electromechanical element according to the present exemplary embodiment is the electric motion motor 115, and the primary piston 117 is screw coupled to the spindle 118 rotated by the electric motion motor 115. Gears 120 are disposed to transfer a torque between the spindle 118 and the electric motion motor 115. The lock unit 125 operated by the solenoid 127 contacts any one of the gears 120 and thus operation limitation or release, i.e., lock or lock release of the electromechanical element, may be executed.

In the foregoing method of controlling a braking system using a brake device having an electromechanical parking function according to an exemplary embodiment of the present invention, after parking braking is generally performed by the electric motion motor 115 at the complex caliper unit 100 side, when parking braking is again converted to primary braking, conversion is performed by an ESC corresponding to the braking control unit 180, and in the ESC, and such a control method may be executed by hardware or a software program.

According to an exemplary embodiment of the present invention, while parking braking is converted to a primary braking state, by securing a gap between a primary piston and a secondary piston, brake oil may be disposed between the primary piston and the secondary piston. Accordingly, when pressing the secondary piston by the primary piston, booster power having responsiveness may operate.

Further, by executing braking by booster power, a capacity of an electric motion motor related to braking can be reduced and thus a compact structure and economic efficiency can be provided, and braking stability and reliability can be secured.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling a braking system using a brake device having an electromechanical parking function, the method comprising:
   a step of starting parking braking by adjusting a hydraulic pressure of a complex caliper unit provided to any one of a front wheel and a rear wheel and a hydraulic caliper unit provided to the other one of the front wheel and the rear wheel so as to perform a braking function by operating at least one of a hydraulic circuit system and an electromechanical element;
   a step of generating a braking force in the brake pad by press contacting by a primary piston disposed at the complex caliper unit to operate a secondary piston disposed at the complex caliper unit so as to be operated by the hydraulic circuit system to press a brake pad by the electromechanical element, and completing the parking braking by limiting an operation location of the electromechanical element;
   a parking release and preliminary braking step of releasing a limitation of an operation location of the electromechanical element, pressing the secondary piston by the primary piston by operating the electromechanical element, and generating a braking force in the front wheel and the rear wheel by operating a hydraulic pump connected to the hydraulic circuit system;
   a primary piston backward moving step of allowing oil inflow of an accumulator for the complex caliper unit and separating the primary piston from the secondary piston by moving the primary piston; and
   a primary piston forward pressing step of blocking oil inflow of an accumulator for the complex caliper unit and pressing the secondary piston by moving the primary piston by the electromechanical element,
   wherein the parking release and preliminary braking step further comprises operating the hydraulic pump to a target pressure level that can hold a vehicle by a braking force applied to the rear wheel side, when generating the braking force in the front wheel and the rear wheel by operating the hydraulic pump.

2. The method of claim 1, wherein the parking release and preliminary braking step comprises blocking a first opening and closing valve connected from the reservoir to the complex caliper unit and the hydraulic caliper unit so as to block movement of oil from the hydraulic pump connected to the complex caliper unit and the hydraulic caliper unit to the reservoir side at which oil is stored, and disposed on a first hydraulic line connected to the hydraulic pump.

3. The method of claim 1, wherein the parking release and preliminary braking step comprises opening a second opening and closing valve on a second hydraulic line that connects a first hydraulic line and the complex caliper unit and opening a third opening and closing valve on a third hydraulic line that connects the first hydraulic line and the hydraulic caliper unit, when generating a braking force in the front wheel and the rear wheel by operating the hydraulic pump.

4. The method of claim 1, wherein oil of an accumulator connected to the complex caliper unit and the hydraulic caliper unit is used up to the target pressure level, and a third hydraulic line connected to the hydraulic caliper unit is blocked by a third opening and closing valve provided to apply the hydraulic pressure to the hydraulic caliper unit, when arriving at the target pressure.

5. The method of claim 4, wherein the primary piston backward moving step comprises releasing pressing of the primary piston by the electromechanical element and opening a fourth opening and closing valve disposed on a fourth hydraulic line that connects the complex caliper unit and the accumulator so as to allow oil inflow of an accumulator for the complex caliper unit.

6. The method of claim 5, wherein a gap is provided between the primary piston and the secondary piston by moving the primary piston screw coupled to a spindle by rotating the spindle that connects the electromechanical element and the primary piston.

7. The method of claim 5, wherein movement of the primary piston by a spindle is stopped when a hydraulic pressure of the complex caliper unit is detected to be at atmospheric pressure or less.

8. The method of claim 5, wherein the primary piston forward pressing step comprises closing the fourth opening and closing valve, moving the primary piston toward the secondary piston by a spindle, and providing a pressure to the secondary piston by booster power by a cross-section ratio of the primary piston and the secondary piston.

9. The method of claim 8, wherein the primary piston presses the secondary piston until a braking force by the complex caliper unit attains a braking force level by the hydraulic caliper unit.

10. The method of claim 8, further comprising a brake pedal response and primary braking step that allows oil inflow by the hydraulic pump to the hydraulic caliper unit by opening the third opening and closing valve on a third hydraulic line connected to the hydraulic caliper unit and in which the primary piston is moved to generate a braking force to correspond to a pressure according to a brake pedal manipulation.

11. The method of claim 1, wherein the electromechanical element is an electric motion motor, the primary piston is screw coupled to a spindle that is rotated by the electric motion motor, gears to transfer a torque are disposed between the spindle and the electric motion motor, and a brake unit that is operated by a solenoid contacts any one of the gears to limit or release operation of the electromechanical element.

\* \* \* \* \*